United States Patent [19]

Sonoda et al.

[11] Patent Number: 5,057,733
[45] Date of Patent: Oct. 15, 1991

[54] MODULAR COIL CORES FOR ELECTRIC MOTOR

[75] Inventors: Takashi Sonoda, Moriguchi; Takafumi Asada, Hirakata, both of Japan

[73] Assignee: Matsushita Electric Industrial Co., Ltd., Osaka, Japan

[21] Appl. No.: 433,210

[22] Filed: Nov. 8, 1989

[30] Foreign Application Priority Data

Nov. 10, 1988 [JP] Japan .................................. 63-284527

[51] Int. Cl.⁵ .......................... H02K 3/52; H01F 3/10
[52] U.S. Cl. ...................................... 310/269; 29/596; 310/67 R; 310/42
[58] Field of Search ...................... 29/596, 606; 310/42, 310/67 R, 216, 254, 261, 269; 336/197

[56] References Cited

U.S. PATENT DOCUMENTS

| 931,375 | 8/1909 | Behrend | 310/269 |
| 2,655,613 | 10/1953 | Wieseman | 310/269 |
| 3,179,825 | 4/1965 | Terry et al. | 310/67 R |
| 3,970,980 | 7/1976 | Nelson | 310/67 R |
| 4,418,296 | 11/1983 | Ebentheuer et al. | 310/67 R |

FOREIGN PATENT DOCUMENTS

| 53-62101 | 6/1978 | Japan | 310/269 |
| 55-74334 | 6/1980 | Japan | 310/269 |
| 56-6636 | 1/1981 | Japan | 310/269 |

Primary Examiner—R. Skudy
Assistant Examiner—D. Rebsch
Attorney, Agent, or Firm—Wenderoth, Lind & Ponack

[57] ABSTRACT

Modular coil cores for an electric motor eliminate tedious coil winding on pole members by making either the pole caps or the complete pole members of the stator yoke engageable with and disengageable from the stator yoke itself.

1 Claim, 3 Drawing Sheets

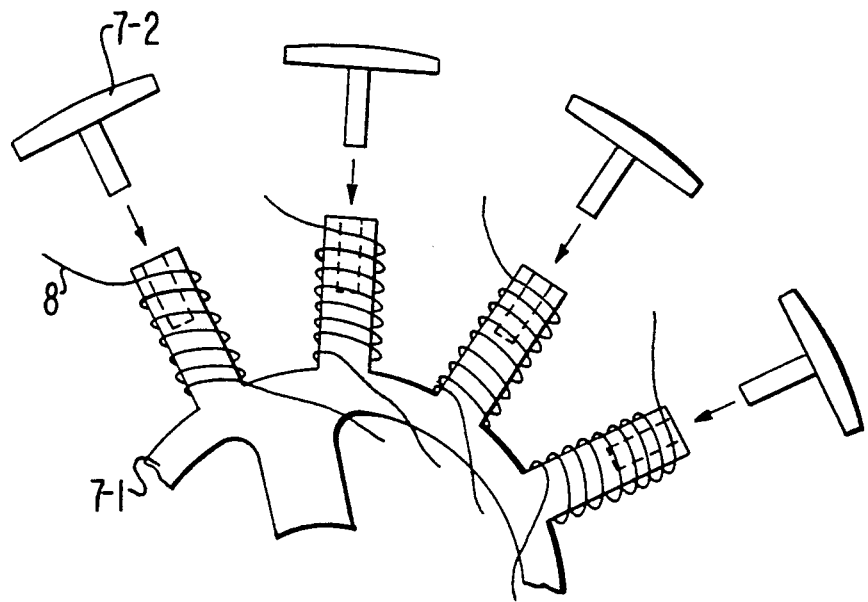
FIG. I (a)
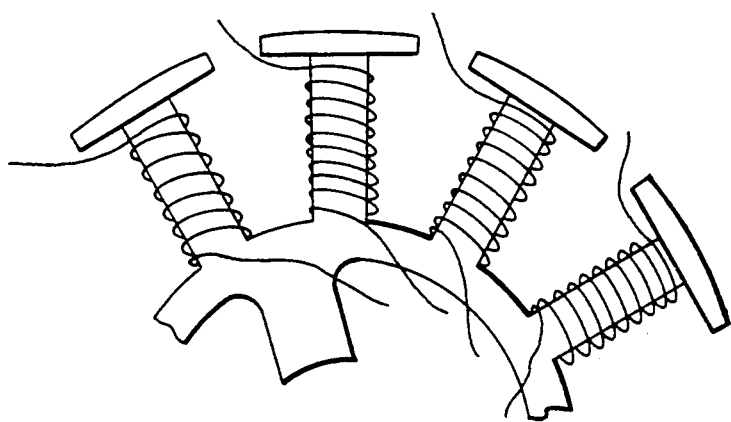
FIG. I(b)

5,057,733

MODULAR COIL CORES FOR ELECTRIC MOTOR

BACKGROUND OF THE INVENTION

The present invention relates to modular coil cores for an electric motor for use with the disc-driving system which drives hard discs and floppy discs used as an external memory device of an information system.

Recently, the overall dimensions of data memory system such as hard discs and floppy discs have to become smaller and thinner in conjunction with the achievement of power economy. Reflecting this trend, manufacturers of those motors for driving these data memory systems study the improvement of the structure, performance, and the processing system today.

Referring now to the accompanying drawings, an example of a conventional motor is explained below.

FIG. 3 is the sectional view of a conventional motor. The conventional motor shown in FIG. 3 is typically composed of a rotor unit having stationary rotor yoke 4 whose inner circumference is provided with a ring-shaped multipole rotor magnet 3 which is secured via hub 10 to the rotary shaft 2 rotatably being supported by pair of bearings 1, a multi-layer stator yoke 7 which is set into the lateral surface of a housing 6 containing the pair of bearings 1, and a stator unit having coil 8 which is wound on the stator yoke 7. The printed substrate 9 on the base 5 securing the housing 6 disposes circuits elements such as hall elements needed for driving the motor unit.

FIG. 4 is the plan view of the stator yoke shown in FIG. 3. Each stator yoke 7 shown in FIG. 4 has the poles wound with coiled wires as shown in FIG. 5.

Nevertheless, since the stator yoke 7 has a complicated shape in the above noted conventional structure, it is extremely difficult for the assembly system to properly wind coiling wire on each poles. Furthermore, it is quite necessary for the assembly system to simplify the method and process for winding coiling wires on the poles in the light of the operating requirements.

SUMMARY OF THE INVENTION

The principal object of the present invention is to fully overcome those problems mentioned above by providing novel modular coil cores for an electric motor which allows an assembly system to easily and simply wind coiling wires onto the poles of the stator unit.

This object is accomplished by providing modular coil cores for an electric motor which comprises a ring-shaped rotor magnet; a stator which is secured in the manner of opposing itself to the inner circumference of the ring-shaped rotor magnet; coiled wires which are respectively wound on the external circumference of pole members of the stator; a housing which secures the stator in position and supports shaft bearings, and a hub which is connected to the shaft and supports the ring-shaped rotor magnet, wherein the pole of the stator have respective pole caps which are inserted into apertures in the pole members.

Furthermore, the modular coil cores for an electric motor may also comprise: a ring-shaped rotor magnet a shaft; a stator which is secured in the manner of opposing itself to the inner circumference of the ring-shaped rotor magnet; a housing which is secures the stator in position and supports the shaft bearings, and a hub which is connected to shaft and supports; wherein pole members wound with coiled wires are inserted into apertures disposed on the outer circumference of the stator.

According to the present invention coiling wire can easily be wound onto the pole member of the stator by allowing the pole cap of the pole member to be engaged with and disengaged from the pole member. Furthermore, it is also possible for the assembly system to initially envelop the pole member with coiling wire made of self-welding wire and then insert the pole cap into an aperture in the pole member, thus effectively simplifying the coiling-wire winding method and process.

Likewise, since the present invention allows the pole members body of with and disengaged from the stator body, it is possible for the assembly system to initially wind coiling wire onto each pole member or envelop the pole member with self-welding wires before eventually inserting the coiled pole into the stator body, thus allowing the coiling operation to easily be done by simplifying the wire-winding process itself.

BRIEF DESCRIPTION OF THE DRAWINGS

FIG. 1(a) is a plan view of the pole members of the stator reflecting the first embodiment of the present invention;

FIG. 1(b) is a plan view after completing the winding of wires on the pole members;

DESCRIPTION OF THE INVENTION

Referring now more particularly to the accompanying drawings, a preferred embodiment of the the present invention is described below.

FIG. 1(a) illustrates the structure of the pole members of the stator reflecting the first embodiment of the present invention. The pole members of the stator are of the multiple-layer structure.

The coiling wire 8 shown in FIG. 1(a) is wound onto each pole member of the stator 7-1. Alternatively, self-welding wire may be wound onto the pole member in place of coiling wire 8. The pole cap 7-2 of the pole member is inserted into the pole member of the stator unit 7-1 through an aperture in the tip of the pole member itself.

FIG. 1(b) illustrates part of the stator unit complete with the insertion of the pole cap 7-2 after completing the winding of coil wire onto the pole member of the stator unit 7-1.

Although the pole cap 7-2 is engageable and disengageable as required, after completing the wire winding onto the pole, the stator unit embodied by the present invention can be used as per the shape identical to that of the conventional stator unit.

As is clear from the above description, according to the first embodiment of the present invention, it is possible for the assembly system to fully eliminate tedions coil winding on pole members of the stator and solve those difficult problems in the wire winding process caused by the complicated shape of the conventional stator, thus achieving a simplified method and process for winding wire on the stator pole members.

Next, the second embodiment of the present invention is described below.

Figure 2:
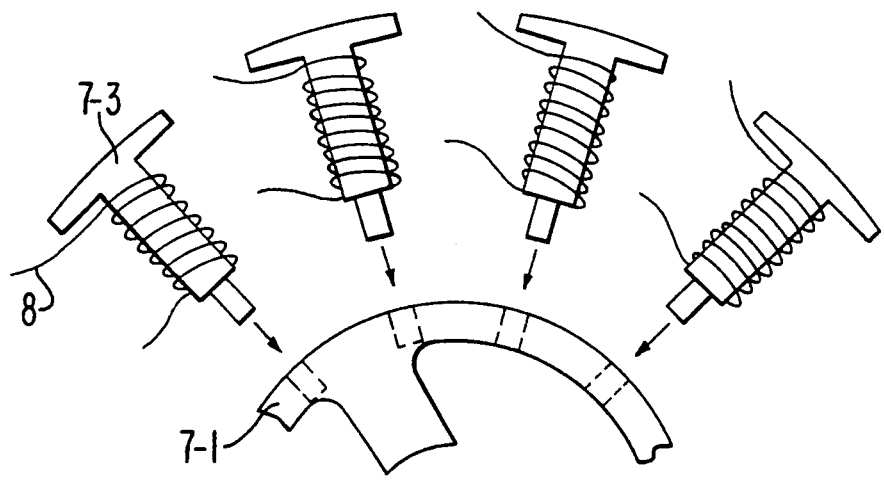
FIG. 2(a) is a plan view of the pole members of the stator reflecting the second embodiment of the present invention.
FIG. 2(b) is a plan view after completing the wire winding on the pole members of the stator shown in FIG. 2(a)
Figure 2:
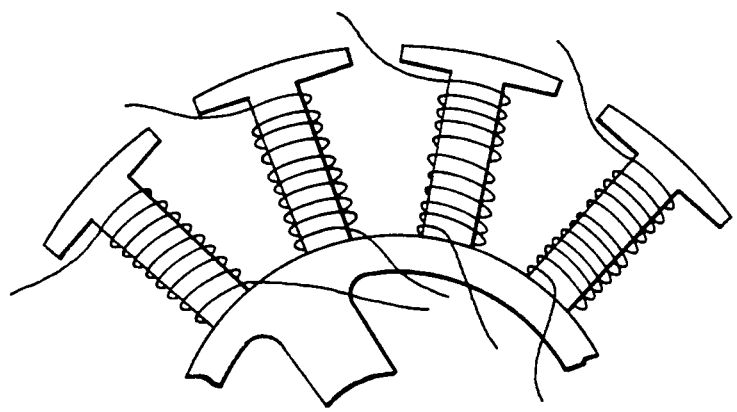
Figure 3:
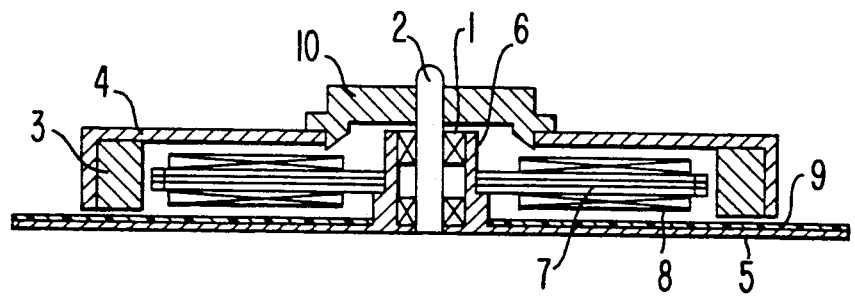
FIG. 3 is a sectional view of a conventional motor.
Figure 4:
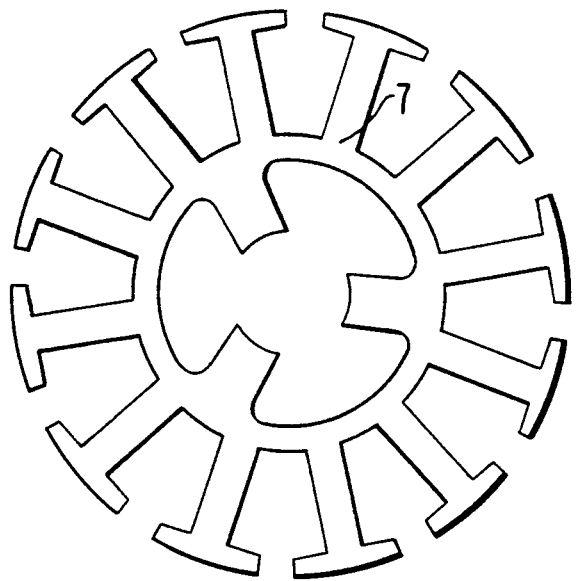
FIG. 4 is a plan view of the overall shape of a conventional stator.
Figure 5:
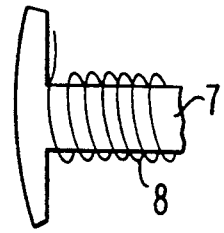
FIG. 5 is a lateral view of the pole member shown in FIG. 4 wound with wire.

FIG. 2(a) illustrates the structure of the pole members of the stator reflecting the second embodiment of the present invention. The pole members of the stator are of the multiple-layer structure.

The stator 7-1 shown in FIG. 2(a) is provided with holes which allow insertion the pole members. Initially, the stator unit 7-1 and the pole members 7-3 are apart from each other. Coiling wire 8 is wound on the pole members 7-3. Alternatively, self-welding wire may be wound onto the pole members 7-3 in place of the coiling wire 8. Finally, each pole member 7-3 is inserted into the holes of the stator 7-1.

FIG. 2(a) illustrates part of the stator 7-1 which is complete with the insertion of the wire-wound pole members 7-3 into holes of the stator 7-1.

Although the stator unit 7-1 and the pole members 7-3 are engageable with and disengageable from each other, the stator embodied by the present invention can be used as per the shape identical to that of the conventional stator.

Like the first embodiment, the second embodiment of the present invention fully eliminates coil winding on the pole members of the stator and solves problems in the wire winding process caused by the complicated shape of the conventional stator, thus achieving a simplified method and process for winding coil wires on the pole members of the stator.

As is clear from the above description, according to the first embodiment of the present invention, the pole members can be inserted into the stator body. This permits the assembly system to easily perform wire-winding operation contrary to the troublesome wire-winding operation thus far done for the conventional stators, The first embodiment permits the placement of coils made of self-welding wire on the pole members before eventually placing the pole caps on the pole members, thus extremely simplifying the method and process for winding wires on the pole members of the stator.

Likewise, the second embodiment of the present invention permits engagement and disengagement of the each entire pole member with and from the stator 7-1. By virtue of this structure, it is possible for the assembly system to initially wind coil wire on each pole member or the placement of a coil made into self-welding wire into each pole member before eventually inserting all the pole members into the stator. As a result, the invention has achieved an easy wire coiling operation and a simplified wire-winding process.

What is claimed is:

1. Modular coil cores for an electric motor comprising: a ring-shaped rotor magnet; a shaft; a stator having pole members, said stator being in the manner of opposing itself to an inner circumference of said ring-shaped rotor magnet; coiled wires which are wound onto an external circumference of said pole members of said stator; a housing which secures said stator in position and supports shaft bearings surrounding said shaft; and a hub which is connected to said shaft and which supports said ring-shaped rotor magnet;

wherein said pole members of said stator have respective pole caps which are inserted tad into apertures in said pole members.

* * * * *